Patented Nov. 28, 1944

2,363,672

UNITED STATES PATENT OFFICE 2,363,672

STABILIZATION OF SHORTENING

Jakob L. Jakobsen, Minneapolis, Minn., assignor to General Mills, Inc., a corporation of Delaware No Drawing. Application November 7, 1941, Serial No. 418,222

6 Claims. (Cl. 99—163)

The present invention relates to the stabilization of animal and vegetable shortenings to prevent the development of rancidity and oxidation, which are commonly encountered in the preparation of such products.

It is well known that naturally occurring oils and fats are protected by various naturally occurring antioxidants present therein. However, during the course of refining operations which have become common in the preparation of such oils and fats for market, these naturally occurring antioxidants have been largely removed. As a result, a constant problem has been encountered in attempting to prevent the development of oxidation and rancidity in the highly refined shortening product. While some desirable results have been obtained, much has been left to be desired.

It has been found that some of the naturally occurring antioxidants originally present in crude oils are distilled off in the deodorization step conventionally employed in refining operations. The most common method of deodorization involves the blowing of steam through a body of oil maintained under a vacuum. The vapor and gases evolved are passed through a jet condenser equipped with a barometric leg. The antioxidants condense and collect as an oily scum or sludge on the surface of the water discharged from the condenser. I have found that this crude sludge may be used directly in the stabilization of fats and oils, requiring only slight subsequent processing. Numerous other methods are also employed for deodorization of oils, and the present invention is applicable to the utilization of sludges derived from any such method. Such materials known in the industry as deodorizer trap sludge and deodorizer hot well sludge are contemplated by the present invention and are included in the terms "crude deodorizer sludge" and "deodorizer sludge" as used herein.

Many of the sludges derived from edible oils contain tocopherols, alpha, beta, and gamma, of which the last named has greatest antioxidant activity. Corn and cottonseed oil sludges owe their antioxidant activity largely to the tocopherols. Other sludges contain antioxidants which are not identical with the tocopherols but which may be suitable for my purpose. For example, peanut oil sludge possesses antioxidant activity but is relatively free from tocopherols. I have found, however, that the sludges suitable for my purpose are lighter than water as distinguished from the heavier than water sludges derived, for example, from sesame seed oil which does not contain tocopherol or the antioxidants contemplated herein. It is, therefore, my intention to include in the present invention the utilization of all deodorizer sludges lighter than water whether such sludges owe their antioxidant activity to the tocopherols, in whole or in part, or whether such sludges are relatively free from tocopherols.

It is, therefore, the primary object of the present invention to provide a process of stabilizing animal and vegetable shortenings by means of crude deodorizer sludge without the necessity of resorting to elaborate and cumbersome refining operations.

It is another object of the present invention to provide a process of stabilizing animal and vegetable shortenings by means of crude deodorizer sludge employed in conjunction with various steps of refining the crude oil or fat.

These and other objects of the invention will be immediately apparent to those skilled in the art from the following description which, for purpose of illustration, relates specifically to the treatment of lard, although it is to be understood that this is merely an example and is not to be construed as limiting the invention, for the reason that the process may likewise be applied to any shortening which is subject to the development of rancidity.

In the refining of animal and vegetable oils, it is customary to follow the following sequence of operations: alkali refining, hydrogenation, deodorization and texturizing. In my process this sequence of operations may be materially altered. In the preferred embodiment of the invention, the crude lard is treated with a small amount of crude deodorizer sludge, following which the mixture may be hydrogenated, alkali refined, deodorized, and texturized, preferably in the order recited.

The lard is melted in a closed vessel or autoclave, and 0.5% of a crude cottonseed sludge containing approximately 4% tocopherol is added thereto. A suitable amount of a catalyst such as a nickel catalyst, is then mixed with it, air is evacuated from the vessel, and hydrogen gas is introduced into the vessel until a pressure of about 60 lbs. per square inch is attained therein. The temperature of the lard in the vessel is then raised to about 125° C. to 200° C. while agitating the lard and the catalyst in the vessel by any suitable means. When a sufficient amount of hydrogen has been absorbed by the lard and the iodine number of the lard has dropped 10 to 15 units, the hyrogenation is stopped, the hydrogen is evacuated from the vessel, and the mixture is cooled to a temperature of about 60° C. while agitating it. Air is then admitted to the vessel, the mixture of lard and catalyst is then removed from the vessel, and the mixture is filtered by any suitable means, such as by pumping it through a filter-press, to separate the catalyst from the lard.

A decidedly unusual result has been found from the above treatment as will be evidenced from the results given hereinafter. The hydrogenation of the mixture of sludge and lard has been found to produce a marked increase in stability. This is believed to be accomplished by the destruction of certain pro-oxidants which applicant has found to be present in the crude materials.

The resulting product may then be subjected to alkali refining according to conventional methods. It has been observed that frequently during hydrogenation, colloidal nickel or nickel soaps are found in the finished product after the usual steps used for removal of the catalyst. These metallic constituents are decidedly pro-oxidant in nature and accordingly tend to reduce the stability of the resultant product. By employing the alkali refining after hydrogenation, I have found that metallic nickel, as well as nickel soaps, may be removed to produce a more stable product. In certain instances, as for example when nickel formate type of catalyst is used, the amount of nickel in the hydrogenated product is relatively high. Also the nickel content of the hydrogenated product is relatively high when a crude oil or fat, containing free fatty acid, is hydrogenated. This high nickel content may be prevented to a certain extent by the proper selection of catalyst, but in any event, it has been found that a certain amount of nickel finds its way into the hydrogenated product. Accordingly, it is desirable to employ the alkali refining step after hydrogenation in order to remove any metallic constituents which may be present therein.

Following the alkali refining, the product may be deodorized and texturized according to conventional procedures to product a creamy product of smooth consistency.

While the above specific method has been found to produce most desirable results, numerous modifications may be employed to produce a satisfactory product. For example, it has been found that in certain cases the crude material, such as leaf lard, may be marketed without alkali refining as it contains a relatively small amount of free fatty acids. In such cases, hydrogenated sludge may be added to crude or hydrogenated lard. While the most satisfactory product is not produced in this manner, some improvements in stability may be obtained as a result of the unusual effect of the hydrogenation. Even in such instances, alkali refining may be employed to advantage after hydrogenation.

It is desired to point out, however, that it is preferable to hydrogenate the mixture of lard and sludge instead of hydrogenating the sludge separately, as in the former case the reaction is more complete and it is simpler to conduct.

In another modification, the crude deodorizer sludge may be added to crude or refined oil or fat and the resultant mixture hydrogenated with or without previous or subsequent alkali refining treatment. In instances in which subsequent alkali refining is not employed, it is preferable to employ a catalyst such as nickel deposited on kieselguhr. In this manner the amount of catalyst carried over into the finished product is considerably reduced and a subsequent alkali refining step may be avoided.

The following table illustrates some of the results obtained according to the present invention:

| Sample No. | Description | Stability |
|---|---|---|
| 1 | Prime steam lard | 12.2 |
| 2 | (1) alkali refined | 9.7 |
| 3 | (2) hydrogenated | 36.0 |
| 4 | (1) hydrogenated | 1.7 |
| 5 | (4) alkali refined | 4.5 |
| 6 | (1) +0.5% hydrogenated cottonseed sludge | 2.0 |
| 7 | (6) alkali refined | 15.5 |
| 8 | (1) +0.5% crude cottonseed sludge, mixture hydrogenated | 16.0 |
| 9 | (8) alkali refined | 86.0 |
| 10 | (1) +1.0% hydrogenated cottonseed sludge | 2.0 |
| 11 | (10) alkali refined | 9.2 |
| 12 | (1) +1.0% crude cottonseed sludge, mixture hydrogenated | 12.0 |
| 13 | (12) alkali refined | 85.0 |

The sludge employed contained 4% tocopherol. In this table, the first column indicates the sample number, the second the description of the sample, the numbers referring to previous samples, and the third, stability in hours. This stability in hours indicates the life of the product when subjected to a standardized accelerated oxidation. The sample is subjected to the oxidative effect of a current of air at an elevated temperature under standardized conditions. When the product reached a peroxide number of 20, the time elapsed was noted. This is the time given in the table. The apparatus utilized in these stability tests was that known as the "Swift" stability testing apparatus. The temperature of the product tested was kept at 98° C. and all tests were conducted under the conditions specified therefor in the literature.

It will be seen from the above table that the present invention produces a very decided increase in stability by means of a very inexpensive material and a very simple procedure and represents a solution to a problem which has heretofore confronted the entire industry. It will be apparent that the present invention permits the utilization of a crude waste material to stabilize oils and fats without elaborate or special purification. The ordinary step in refining the crude oil or fat, at the same time effect purification of the crude deodorizer sludge, thus avoiding any separate or special treatment.

While the above description of the invention has been largely directed to the treatment of lard which is intended to include leaf lard, prime steam lard, rendered pork fat and the like, it will be apparent that other animal and vegetable oils, such as corn, cottonseed, soybean, oleo oils, and beef fat, which are subject to the development of rancidity may also be improved by the employment of the present invention. By the term "shortening" as used herein, it is intended to include all fatty products whether solid or liquid at ordinary temperature and is intended to include all fats and fatty oils whether of animal or vegetable sources and which are intended for use in the manner ordinarily contemplated by the term. Furthermore, the individual refining steps referred to are merely exemplary and it will be apparent that these specific steps may be varied in any manner without departing from the spirit of the present invention. Likewise, the amount of deodorizer sludge may be varied within considerable limits, depending upon the results desired. While the specific description of the invention has been given in order to enable the art to clearly understand the invention, it is to be understood that the same is not limited thereto but may be varied within the scope of the following claims.

I claim as my invention:

1. A process of stabilizing shortening which comprises adding a tocopherol-containing deodorizer sludge to a shortening and hydrogenating the resultant mixture.

2. A process of preparing and stabilizing a shortening which comprises adding a tocopherol-containing deodorizer sludge to a shortening, hydrogenating the resultant mixture, and then subjecting the hydrogenated mixture to alkali refining.

3. A process of preparing and stabilizing animal oil or fat which comprises adding a tocopherol-containing deodorizer sludge to a material selected from the group consisting of animal oils and fats, hydrogenating the resultant mixture, and then subjecting the hydrogenated mixture to alkali refining.

4. A process of preparing and stabilizing lard which comprises adding tocopherol-containing deodorizer sludge to crude lard, hydrogenating the resultant mixture, and then subjecting the hydrogenated mixture to alkali refining.

5. A process of preparing and stabilizing shortening which comprises adding tocopherol-containing crude deodorizer sludge derived from cottonseed oil to a shortening, hydrogenating the resultant mixture and then subjecting the hydrogenated mixture to alkali refining.

6. A process of preparing and stabilizing shortening which comprises adding a tocopherol-containing crude deodorizer sludge to a shortening which has not been completely refined, alkali refining the resultant mixture, and then hydrogenating the refined mixture.

JAKOB L. JAKOBSEN.